United States Patent [19]

Brodbeck et al.

[11] 4,248,115

[45] Feb. 3, 1981

[54] SLIDING TABLE ASSEMBLY - TILTING ARBOR SAWS

[75] Inventors: Joseph F. Brodbeck, Bellefontaine; Raymond Kazusky, Jr., Chardon, both of Ohio

[73] Assignee: Rockwell International Corporation, Pittsburgh, Pa.

[21] Appl. No.: 71,823

[22] Filed: Sep. 4, 1979

[51] Int. Cl.³ .............................................. B27B 25/10
[52] U.S. Cl. .................................. 83/435.1; 83/477.2; 83/437; 144/287; 144/286 R
[58] Field of Search ................. 83/435.1, 437, 477.2, 83/648, 425; 144/286 R, 287

[56] References Cited

U.S. PATENT DOCUMENTS

| 746,972 | 12/1903 | Marsh | 144/287 X |
| 901,699 | 10/1908 | Fetzer | 83/435.1 |
| 1,346,269 | 7/1920 | Smith | 83/435.1 |
| 1,658,826 | 2/1928 | Yerk et al. | 144/287 |
| 2,435,382 | 2/1948 | Caskey | 83/435.1 |
| 2,450,601 | 10/1948 | Lasar | 83/435.1 |
| 2,555,217 | 5/1951 | Young | 144/286 R X |
| 2,722,243 | 11/1955 | Nagy | 144/286 R X |
| 3,429,347 | 2/1969 | Klein | 83/435.1 |
| 4,068,551 | 1/1978 | Kreitz | 144/286 R |

Primary Examiner—Donald R. Schran

[57] ABSTRACT

An extension assembly for handling large workpieces, such as wall panels, doors, or the like. It is designed to be attached to existing saws as well as new ones, and minimizes the frictional resistance of moving a workpiece across a saw table.

9 Claims, 6 Drawing Figures

SLIDING TABLE ASSEMBLY - TILTING ARBOR SAWS

BACKGROUND OF THE INVENTION

Tilting arbor table saws have long been highly regarded for their utility and versatility of the woodworking field. A number of operations can be formed on them, and their utility is further broadened by the use of accessories and attachments, such as dado cutting sets and the like.

In the recent past, large panels have come into extensive use, both in original construction and in remodeling. This has led to a number of devices for accommodating the large panels while cutting and/or shaping them. One, U.S. Pat. No. 4,068,551, is an extension table for a different type of saw—the radial arm type where the work is positioned on the table and the saw moved relative to the work. Another, U.S. Pat. No. 3,931,751, is designed to be portable and collapsible so as to be moved from one job site to another.

SUMMARY OF THE INVENTION

The present invention is a sliding table for handling large panels on a tilting arbor table saw to accomplish accurate work upon these panels. Provision is made for adjustment of this table so that accuracy is attained upon assembly and can be maintained during use.

A principal object of this invention is a table attachment for accurately working on elongated workpieces, the attachment having suitable adjustments to insure accurate cutting.

Another important object is the provision of an accessory suitable for attachment to saws already in use.

Another important object is the provision of an accessory equipped with a fence adjustable for miter cuts.

Another object of the invention is the provision of an adjustable stock stop for repetitive cuts.

Another object of the invention is the provision of a sturdy extended support that is accurate and yet economical.

DESCRIPTION OF THE ILLUSTRATED EMBODIMENTS

Figure 1:
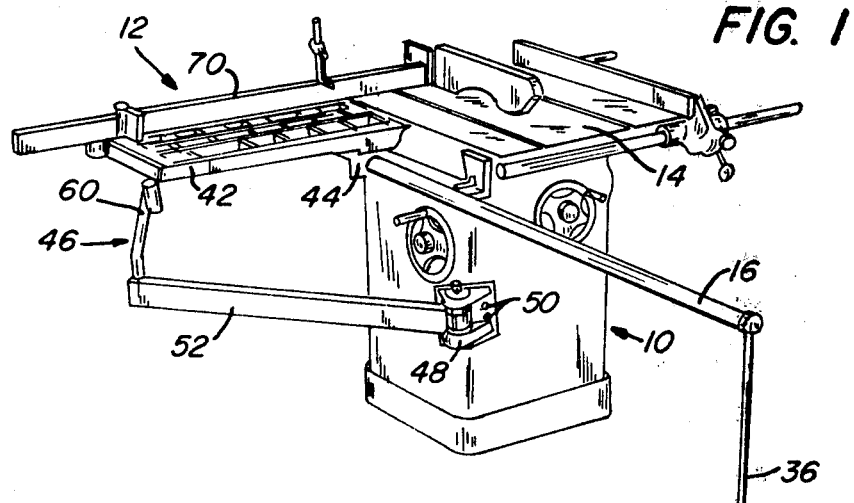
FIG. 1 is a perspective view of a tilting arbor table saw with the present invention mounted thereon.
Figure 3:
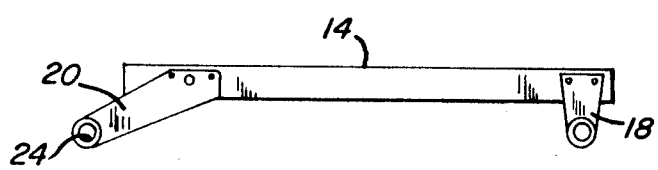
FIG. 3 is a detail of the mounting brackets on the side of the saw table.
Figure 2:
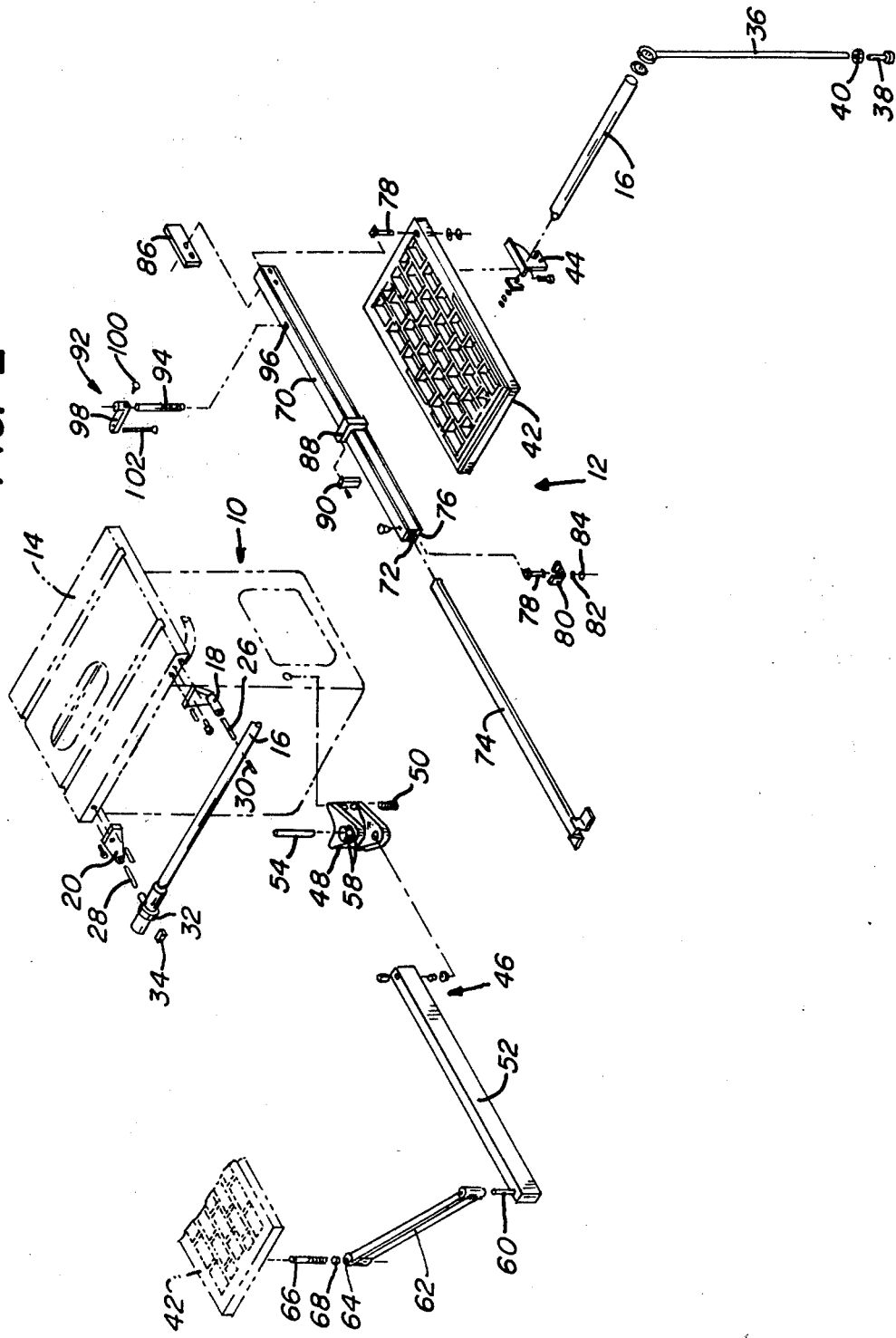
FIG. 2 is similar to FIG. 2, with the parts shown in exploded view.

Referring primarily to FIGS. 1 and 2, the first embodiment will be described. Tilting arbor table saw 10 sometimes comes with provision for extension wings (not shown). These wings give more support surface, but sometimes even these are not sufficient. The sliding table 12 of the instant invention has been devised to accommodate extra long panels and the like. It is mounted on the side of the table 14 in place of the extension wing for that side, if one had previously been mounted on the saw. A circular slide, or rail, 16 is mounted to the side of the table 14 by brackets 18 and 20, respectively (see FiG. 3). Bores 22 and 24 in brackets 18 and 20, respectively, receive shafts 26 and 28 respectively. These stub shafts each have an outboard portion that has its longitudinal axis eccentric to the inboard portion longitudinal axis. Thus, by suitable rotation of either shaft 26 or 28, a corresponding adjustment may be made in the orientation of slide 16, thus allowing the slide table (which will be described later) travel to be adjusted relative to the saw table top 14. A capscrew 30 threads into the end of shaft 26, through a suitable hole in rail 16 to lock shaft 26 in adjusted position and fasten rail 16 on shaft 26 (see FIG. 2). Shaft 28 has support bracket 32 mounted on its outer end, and they are held in place by setscrews (not shown) in rear bracket 20 and support bracket 32. Locking knob 34 locks rail 16 in bracket 32. In addition, parallelism of rail 16 with table 14 is adjusted by the aforementioned setscrew in rear bracket 20 and by a setscrew (also not shown) in front bracket 18.

As can be seen from FIGS. 1 and 2, rail 16 is designed to project toward the operator of the saw some small distance before front bracket 18. The rail 16 is supported by a post 36 fixed at the outer end of the rail. Post 36 has an adjustment mechanism consisting of a bolt 38 and a locknut 40. The bolt 38 is threaded into the bottom of post 36 and is adjustable to level the rail 16 and also for meeting uneven floor surfaces, etc.

A sliding table 42 is mounted on rail 16 for sliding movement back and forth by means of bearing mounting brackets 44 (one of which is shown in FIGS. 1 and 2). These mounting brackets carry roller bearing, not shown, which ride on the rail 16 and support the inner edge of the sliding table adjacent the saw. These two bearing mounting brackets conceivably could carry other types of low-friction sliding elements to allow movement of the table back and forth along rail 16.

Figure 4:
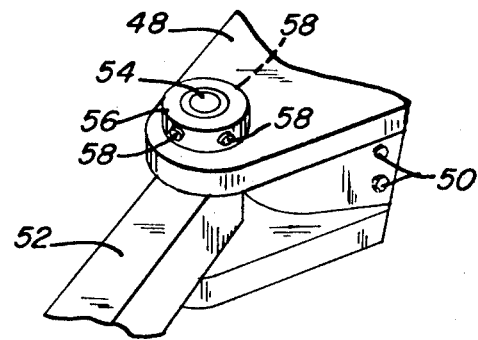
FIG. 4 is a detail view of the mounting bracket for the articulated arm.

Still referring to FIGS. 1 and 2, the outer end of the sliding table 42 is supported by an articulated arm assembly 46. The inner end of the articulated assembly is supported on a bracket 48 shown in more detail in FIG. 4. The bracket 48 is held to the side (or in this case the corner) of the saw by capscrews 50 or other suitable fastening means. A bore on the inner end of lower arm 52 of the articulated arm assembly receives a pivot pin 54 which is also received in a bushing (not shown) in the bottom bore of bracket 48. The upper arm of bracket 48 has a boss 56 integrally cast with it and an oversized hole aligned with the bore in the bottom of the bracket and the arm 52. In the boss 56 are three holes drilled and tapped for receiving socket head setscrews 58 which are then used to align pivot pin 54 in the assembly of this attachment.

Lower arm 52 has at its other end a pin 60 which pivotally receives a bore in upper arm 62. At the end of upper arm 62 remote from the bore receiving pin 60 is a threaded blind bore 64 for receiving a pin 66 which is threaded on its bottom end for adjustment vertically with respect to upper arm 62. A locknut 68 retains pin 66 in adjusted position. The pin 66 is received in a blind bore on the underside of table 42 for pivotally allowing table 42 and arm 62 to move with respect to each other.

From the foregoing, it can be seen that the assembly when placed on a table saw allows the use of the sliding table for a considerable distance before the saw and traveling through the saw. It will be seen that if desired the rail can be extended beyond the saw but for practical purposes, it has been found that the rail in the present showing is the most useful.

A fence 70 is used to position the work as it is moved through the saw and can be mounted on the sliding table either in the forward or the aft position. Referring to FIG. 1 and more particularly to FIG. 2 we see the fence which is a generally rectangularly shaped metal piece having a hollow rectangularly shaped bore 72 for reception of a fence extension 74. The bottom side of fence 70 also has a slot running longitudinally along the bottom for reception of tee-head bolts 78. The bolt nearer the saw blade is mounted in either of two positions—either the forward or aft end of the sliding table. Three drilled holes are provided for this purpose. The other bolt accommodates a clip 80 which fastens on the outer edge of the sliding table 42. The clip is retained in position by washer 82 and nut 84. Thus, it can be seen that the fence can be angled with respect to the line of travel of the table for an angle cut or it can be square across for a square cut.

At the inner end of the fence adjacent the saw blade, chip breakers 86 (one of which is shown in FIG. 2) are bolted to the sides of the fence. A sliding stop bracket 88 mounts on the fence 70 and is adjustable for the size of the material being worked on. The front face of stop bracket 88 is the same thickness as chip breaker 86 so that a member positioned on the sliding table will bear against chip breaker 86 and the front face of stop bracket 88. A stop member 90 is positioned on the side of the stop bracket so that the piece being worked on can be abutted against this stop member if desired.

A clamp attachment 92 comprises a bar 94 which is threaded at its lower end for mounting in the threaded hole 96 of fence 70. Mounted on the bar is a bracket member which slidingly fits down over bar 94 and is retained in place by a clamp screw 100. At the outer end of bracket 98 is a threaded hole which receives work clamp 102 threaded into it.

It can be seen that the work can be placed on the table and this clamp screwed down against it to hold it in place while working on the workpiece. As can be seen in FIG. 1, there are times when the fence is mounted at the forward end of the sliding table and at these times, of course, the bracket and work clamp are swung around to the rear of the fence for use.

Figure 6:
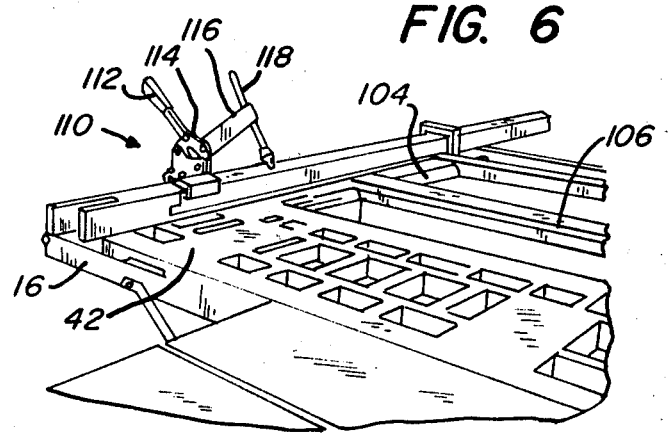
FIG. 6 is a partial view of the embodiment of FIG. 5, as viewed from the region of the saw blade.
Figure 5:
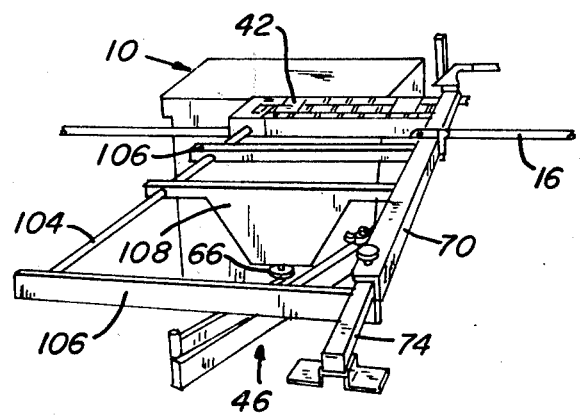
FIG. 5 is a perspective view of another version of the invention, providing capacity for greater length workpieces.

An alternate embodiment of this sliding table is shown in FIGS. 5 and 6. The mounting of sliding table 42 to the rail 16 and the mounting of rail 16 to the saw 10 are the same as in the first embodiment. However, to accommodate extremely long panels, a pair of rods 104 (one of which is shown in FIG. 5, the other is shown in FIG. 6) are fixed in the outer side of table 42. These rods are stiffened by intermediate cross-members 106 and an intermediate support 108 which is dimensioned to stiffen the rods 104 and receive pivot pins 66. It can be appreciated that the articulated arm assembly 46 will have to be dimensioned somewhat differently for this embodiment, but the arrangement of parts and the connections are the same as in the first embodiment. The cross-members 106 and support member 108 have their top surface planar with the top of sliding table 42. The fence 70 and extension 74 can be the same as shown in the first embodiment.

Also shown in FIGS. 5 and 6 is a quick clamp attachment 110. By moving handle 112 forwardly from the position shown in FIG. 6, the link 114 moves bracket 116 downwardly clamping the threaded workclamp 118 against the work. This eliminates the need for threading and unthreading at each replacement of workpiece. p It will be seen by a review of the specification, claims and drawings that a novel sliding table for handling elongated workpieces has been developed.

I claim:

1. In combination with a power saw of the type having a generally rectangular flat-topped horizontal worktable with a cutting blade projecting through an opening therein, said worktable being mounted upon a rigid cabinet-like base, an extension assembly for handling long workpieces attached to one side of said worktable; said extension assembly comprising, guide rail mounted to said worktable by a plurality of brackets, an extended work supporting member slidable along said guide rail parallel to the plane of said cutting blade, guide means adjustably positioned on said work supporting member for engaging an edge of said long workpiece, clamp means for retaining said workpiece in fixed relation to said guide means and said work supporting member during the cutting operation and a pivot arm sub-assembly for supporting the end of said work supporting member remote from said guide rail.

2. An extension assembly for attachment to a tilting arbor table saw comprising, a guide rail attachable to one side of the table of said saw by a plurality of adjustable bracket members, a work supporting member mounted on said guide rail for longitudinal sliding movement therealong and a pivot arm sub-assembly attachable to the cabinet for supporting the end of said work supporting member remote from said guide rail.

3. The extension assembly of claim 2 wherein a guide means is selectively and adjustably positionable on said work supporting member.

4. The extension assembly of claim 3 wherein a clamp means is selectively positionable along said guide means.

5. The extension assembly of claim 3 wherein a stop means is selectively positionable along said guide means.

6. The extension assembly of claim 2, wherein said pivot arm sub-assembly comprises a bracket attachable to said cabinet, pivotally mounting an articulated support arm which supports said work supporting member.

7. The extension assembly of claim 6, wherein said pivotal mounting between said bracket and said support arm, is adjustable about a vertical axis.

8. The extension assembly of claim 2, wherein said work supporting member includes a telescoping, horizontally extensible member mounted in said end of said work supporting member remote from said guide rail.

9. The extension assembly of claim 2, wherein said guide rail includes a supporting leg on one end.

* * * * *

UNITED STATES PATENT AND TRADEMARK OFFICE
CERTIFICATE OF CORRECTION

PATENT NO. : 4,248,115
DATED : February 3, 1981
INVENTOR(S) : Joseph F. Brodbeck and Raymond Kazusky, Jr.

It is certified that error appears in the above-identified patent and that said Letters Patent are hereby corrected as shown below:

Column 1, line 7, delete "of" and insert --in--; and line 8, delete "formed" and insert --performed--.

Column 2, line 10, delete "slide" and insert --sliding--; line 15, after "has" insert --a--; and lines 41-42, delete "assemlby" and insert assembly--.

Column 4, line 9, delete "pI", start a new paragraph and insert --It--; line 20, after "comprising" insert --a--.

Signed and Sealed this

Twenty-sixth Day of January 1982

[SEAL]

Attest:

GERALD J. MOSSINGHOFF

Attesting Officer     Commissioner of Patents and Trademarks